June 21, 1932.  L. WYNER ET AL  1,864,035
ELECTRIC WATER HEATING DEVICE
Filed Dec. 15, 1930
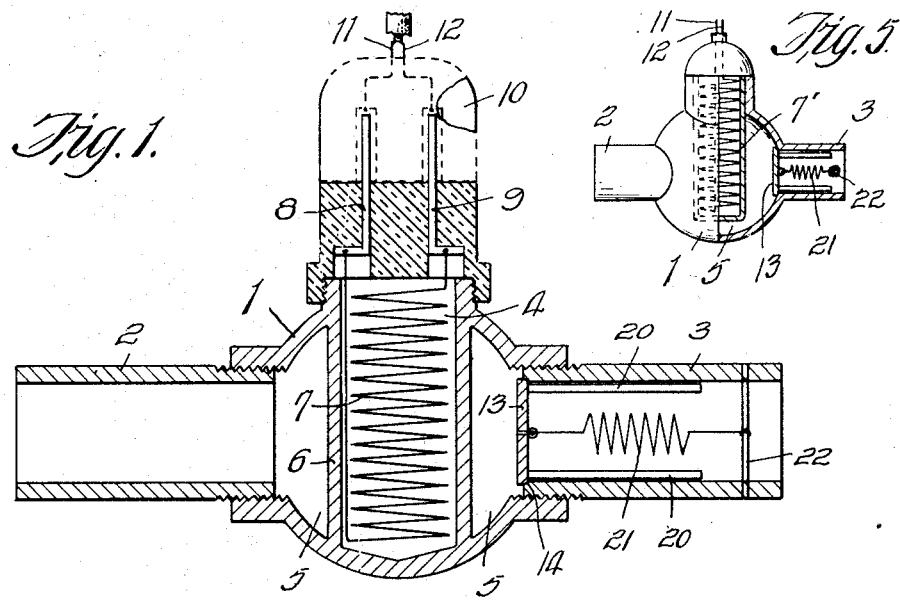
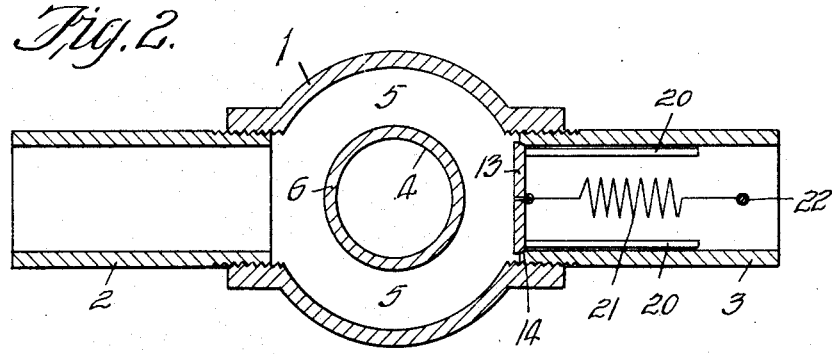
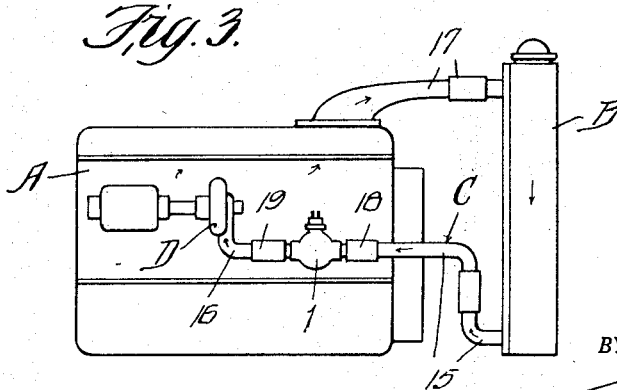
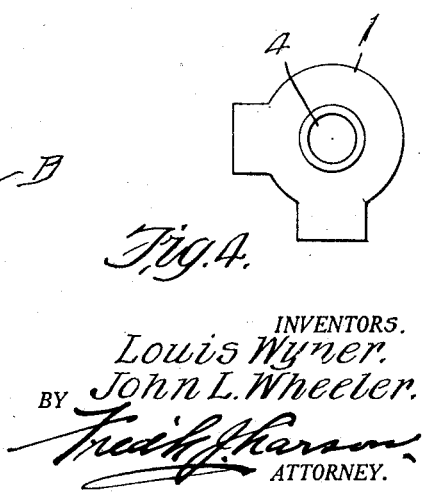
INVENTORS.
Louis Wyner.
John L. Wheeler.
BY Fredk. J. Larson
ATTORNEY.

Patented June 21, 1932

1,864,035

UNITED STATES PATENT OFFICE

LOUIS WYNER, OF UNIVERSITY CITY, AND JOHN L. WHEELER, OF ST. LOUIS, MISSOURI

ELECTRIC WATER HEATING DEVICE

Application filed December 15, 1930. Serial No. 502,313.

Our invention relates to electric water heaters, and, more particularly to a device for heating the water of the cooling system of an automobile motor in cold weather to render easy starting of the motor.

The object of our invention is the provision of an electric water heating device adapted to be connected to the water line of a water cooled automobile motor between the radiator and the motor block to keep the water in the motor block and radiator warm in freezing weather, to heat the water in cold weather prior to starting the motor on cold mornings and to prevent the oil adhering to the several working parts of the motor within the motor block from congealing.

A further and important object of the invention is providing the water passage of the heating device with a spring closed valve to prevent water, being heated in the heating device, from flowing back toward the radiator and to cause the heated water to first move toward and through the pump and motor block and then into the radiator from where it moves toward the heating device.

A further object of the invention resides in the provision of a heater embodying a casing having an electric heating element receiving chamber separated from the water passage thereof and to provide the intake end of the water passage with a spring closed valve to prevent the water heated within the water passage of the casing from backing up into the radiator of an automobile.

A still further object of the invention is the provision of a device for heating the water of the cooling system of an automobile which possesses advantages in points of simplicity and efficiency, and, at the same time proves itself comparatively inexpensive in cost of manufacture.

With the above and other objects in view, the invention consists in the novel features of construction, arrangement and combination of parts hereinafter more fully described and finally pointed out in the claims hereto appended.

Referring to the accompanying drawing forming a part of this specification, wherein like characters of reference denote similar parts throughout the several views:

Fig. 1 is a vertical sectional view of an electric water heating device embodying the features of my invention.

Fig. 2 is a horizontal sectional view of the water heating device.

Fig. 3 is a view showing the water heating device connected to the water line between the automobile radiator and the water pump.

Fig. 4 is a plan view of the water heater where the intake and outlet are arranged at right angles to each other instead of in alignment, as shown in Figs. 1, 2 and 3.

Fig. 5 is a view showing the use of an electric heating element in the form of a cartridge, this eliminating the use of the walled chamber in the water passage of the heater casing.

Referring to the drawing, the reference character A designates generally a water cooled automobile motor; B, the radiator of the automobile, and C, the water feed line from the radiator to the block of the motor. D represents the water pump.

In carrying out the aim of our present invention, we employ a suitable metallic casing 1 having the hose connecting nipples 2 and 3. The casing 1 is provided with a suitable chamber 4 and a water passage 5 surrounding the wall 6 of the chamber 4 which passage extends through the hose nipples 2 and 3. The chamber wall 6 may be an integral part of the casing, or it may, if desired, be an insert in the form of a metallic tube, as is manifest.

A suitable electrical heating element 7 is disposed within the chamber 4 of the casing 1 and it has connection at opposite ends with the conductors 8 and 9, which conductors are adapted for detachable connection with an electric socket 10, or equivalent fixture, carried by a pair of electrical conductors 11 and 12, respectively for carrying electric current to the heating element 7. The heating element 7 may be either in the form of a heating coil, as shown in Fig. 1 to fit in the walled chamber 4, or it may be in the form of a cartridge 7' as shown in Fig. 5 to be inserted directly into the water chamber, thus eliminating the use of the wall 6, shown in Fig. 1.

A suitable valve head 13 is disposed in the water passage 5 at the inner end of the hose nipple 3 of the casing 1 and is adapted for engagement with a valve seat 14 at the inner end of the hose nipple 3 through which nipple the water flows from the radiator B through a pipe or equivalent connection 15 to the water passage 5 of the heater casing 1 and from which passage it flows, or circulates through the pipe or equivalent connection 16 to the pump D from where it enters the block of the motor A to be returned to the radiator through the usual tube and hose connection 17.

The heating device is connected with the water pipe connections 15 and 16 by means of the hose, or equivalent connections 18 and 19, respectively.

The valve head 13 is provided with a plurality of guide pins 20 which extend into the passage of the hose nipple 3 and slidingly engages the inner face of the hose nipple. A suitable light coiled spring 21 or equivalent resilient means is employed for connection at one end with the valve head 13, and at its opposite end with a cross-pin 22 carried by the hose nipple 3 for the purpose of normally holding the valve closed to prevent the heated water within the water passage of the casing 1 from backing up toward the radiator B, thus insuring the heated water flow, or circulation thereof toward and through the pump and into the motor block. The water pressure from the radiator is sufficient to insure opening of the valve sufficient to permit the flow of water from the radiator to the water passage of the casing 1, as the heated water therein moves toward the block of the motor.

From the foregoing description, it is evident that we provide a water heating device of the class described, which will heat the water in the cooling system of an automobile engine and radiator sufficiently to keep the water from freezing when the motor is not running and thereby keep the oil which adheres to the several movable parts of the motor block from congealing so as to insure quick starting of the motor on a cold morning, or after being parked outdoors, where facilities are provided for supplying electrical current to the heating element of the water heating device.

Parking lots, for instance, as well as garages, can be equipped with the necessary electric wiring and with extension cords directed therefrom for attachment to the heating element of the water heating device, thus insuring just as quick starting of the motor of an automobile left standing on a parking lot on a cold day as if it were parked in a heated garage.

By the use of a time clock, not shown, connected with the electric wiring remote from the heating device, the electricity can be automatically turned on at any predetermined time to insure the water being sufficiently heated prior to starting of the motor to permit quick starting of the motor at any hour of the morning where the automobile is garaged in a cold building at nights, thus saving on the battery and rendering less strain on the motor parts.

By the use of our heating device, water in the motor and radiator may be heated all night, all day, or the device may be attached to an electric circuit only long enough to heat the water before starting the motor when it is cold.

The many advantages of the herein described invention will readily suggest themselves to those skilled in the art to which it appertains.

From the foregoing description it is evident that a simple device for this purpose has been disclosed, but it is to be understood that we do not desire to restrict, or limit ourselves to the very details of the construction shown and described, which is merely illustrative, it being obvious that changes, not involving the exercise of invention, may be made without conflicting or departing from the spirit of the invention within the scope of the appended claims.

What we claim is:

1. The combination of a water jacketed internal combustion engine having a water inlet pipe leading from a radiator and provided with a water circulating pump, of a hollow water heater body having an inlet and an outlet member coupled to the water inlet pipe, an electrical heating unit enclosed in said water heater body, a valve disposed within the heater body closing the inner end of the inlet member, fingers directed from said valve into the inlet member of the heater body for guiding the movement of the valve, a coiled spring of sufficient strength to normally hold the valve in a closed position and yet permit opening movement thereof by the action of the pump and said valve serving to prevent the back flow of water from the water heater body to the radiator while being heated by the electrical heating unit.

2. The combination of a water jacketed engine having a water inlet pipe leading from a radiator and provided with a water circulation pump, of a hollow heater body having inlet and outlet members connected by couplings to said water inlet pipe between the pump and the radiator, a valve seat formed at the inner end of the inlet member of said heater body, a valve head mounted upon said valve seat, means directed from and disposed within the inlet member for engagement with the inner wall thereof for guiding the movement of said valve head, resilient means within the inlet member of the heater body for yieldingly holding the valve head in its normally closed position and an electrical heating unit enclosed in the heater body.

3. In combination with an electrical water heater adapted to be applied to the inlet water pipe for connecting a radiator with the water jacket of an internal combustion engine, of a water inlet member on the body of said heater, a valve seat at the upper end of said member, a flat disc valve mounted on said seat, means directed from the disc valve into the water inlet member for sliding contact with the inner wall of the inlet member to guide the valve in its movements and resilient means disposed within the inlet member and connected at one end centrally of the valve and at its opposite end with the inner wall of the inlet member.

In testimony whereof we have hereunto affixed our signatures.

LOUIS WYNER.
JOHN L. WHEELER.